United States Patent
Kim et al.

(10) Patent No.: US 10,449,468 B2
(45) Date of Patent: Oct. 22, 2019

(54) STACKED TYPE FALLING FILM EVAPORATOR, ZERO LIQUID DISCHARGE SYSTEM COMPRISING THE SAME, AND ZERO LIQUID DISCHARGING METHOD USING THE SAME

(71) Applicant: DOOSAN HEAVY INDUSTRIES & CONSTRUCTION CO., LTD., Gyeongsangnam-do (KR)

(72) Inventors: Sang Moon Kim, Busan (KR); Youngjun Ro, Seoul (KR); Gun Myung Lee, Daegu (KR); Jae Seung Choi, Gyeongsangnam-do (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 791 days.

(21) Appl. No.: 14/557,969

(22) Filed: Dec. 2, 2014

(65) Prior Publication Data
US 2015/0190727 A1     Jul. 9, 2015

(30) Foreign Application Priority Data
Jan. 8, 2014 (KR) .................. 10-2014-0002462

(51) Int. Cl.
    *B01D 1/06*         (2006.01)
    *B01D 3/00*         (2006.01)
    (Continued)

(52) U.S. Cl.
    CPC ........... *B01D 1/065* (2013.01); *B01D 1/2884* (2013.01); *B01D 3/007* (2013.01); *B01D 9/0031* (2013.01);
    (Continued)

(58) Field of Classification Search
    CPC ...... B01D 1/065; B01D 1/2884; B01D 3/007; B01D 21/01; B01D 9/0031; C02F 1/041; C02F 1/08; C02F 11/127
    See application file for complete search history.

(56) References Cited

U.S. PATENT DOCUMENTS 4,561,941 A * 12/1985 Dinnage ................. A23L 2/10
                                                                 159/24.3
6,309,513 B1    10/2001   Sephton

FOREIGN PATENT DOCUMENTS

DE       102012203439 A1    9/2013
KR       1019900006071 B1    8/1990
                       (Continued)

OTHER PUBLICATIONS

Angeletti, S. et al. (1983), Journal of Food Technology, 18, 539-563. (Year: 1983).*

(Continued)

*Primary Examiner* — Brian A McCaig
(74) *Attorney, Agent, or Firm* — Invenstone Patent, LLC

(57) ABSTRACT

A stacked type falling film evaporator includes a first evaporator, a second evaporator, a first vapor recovering device, a second vapor recovering device and a vapor recompressor. The first evaporator and the second evaporator respectively have evaporation tubes of a length of 5 m to 10 m, and are stacked in such a manner that wastewater passes through the first evaporator and the second evaporator in order. The first vapor recovering device collects vapor generated from the wastewater in the first evaporator and supplies the collected vapor to the second evaporator. The second vapor recovering device collects vapor generated from the wastewater in the second evaporator and supplies the collected vapor to the first evaporator. The vapor recompressor compresses the vapor collected in the second vapor (Continued)

recovering device before the vapor is supplied to the first evaporator.

13 Claims, 4 Drawing Sheets

(51) Int. Cl.
| | |
|---|---|
| C02F 1/04 | (2006.01) |
| C02F 1/08 | (2006.01) |
| B01D 9/00 | (2006.01) |
| B01D 21/01 | (2006.01) |
| B01D 1/28 | (2006.01) |
| C02F 1/52 | (2006.01) |
| C02F 1/44 | (2006.01) |
| C02F 11/127 | (2019.01) |

(52) U.S. Cl.
CPC .............. *B01D 21/01* (2013.01); *C02F 1/041* (2013.01); *C02F 1/08* (2013.01); *C02F 1/441* (2013.01); *C02F 1/5245* (2013.01); *C02F 11/127* (2013.01); *C02F 2001/5218* (2013.01); *C02F 2201/002* (2013.01); *C02F 2301/046* (2013.01); *C02F 2301/08* (2013.01)

(56) References Cited

FOREIGN PATENT DOCUMENTS

| | | |
|---|---|---|
| KR | 1019970010663 A | 3/1997 |
| KR | 1020040053670 A | 6/2004 |
| KR | 100465885 B1 | 1/2005 |
| KR | 1020070065874 A | 6/2007 |
| KR | 10-1152305 B1 | 6/2012 |
| KR | 10-1272875 B1 | 6/2013 |

OTHER PUBLICATIONS

Korean Office Action dated Jun. 23, 2015 in corresponding Korean Patent Application No. 10-2014-0002462.
Extended European Search Report dated Jul. 1, 2015 in corresponding European Patent Application No. 14197942.7-1352.

* cited by examiner

STACKED TYPE FALLING FILM EVAPORATOR, ZERO LIQUID DISCHARGE SYSTEM COMPRISING THE SAME, AND ZERO LIQUID DISCHARGING METHOD USING THE SAME

CROSS-REFERENCE TO RELATED APPLICATIONS

This application claims priority to Korean Application No. 10-2014-0002462, filed Jan. 8, 2014, the contents of which are incorporated herein in their entirety.

BACKGROUND

The present disclosure relates to a stacked type falling film evaporator, a zero liquid discharge system comprising the same, a zero liquid discharging method using the same. In particular, two evaporators may respectively have evaporation tubes with a relatively short length that are installed in a two-stage stacked type evaporator in a vertical direction, thereby addressing the problems of evaporators with reduced efficiency due to formation of a dry zone inside the evaporation tubes, providing easy installation and maintenance due to modularization, simplifying pipelines, and reducing a site area required for installing equipment.

The stacked type falling film evaporator may be applied to a zero liquid discharge system for desulfurized wastewater in power plants or industrial wastewater, but is not restricted to the above and may be applied to various industry fields where a high-degree evaporation process, seawater desalination, or salt production processes are useful.

Recently, companies and academic circles are becoming more and more interested in Zero Liquid Discharge (ZLD) systems. There are indications of a gradual increase of the supply price of industrial water, a gradual increase of production costs due to an increase of discharge fees by regulations on total quantity of effluent water, and a scheduled enactment of a recycling obligation of more than ⅓ of effluent discharge flow. Also, companies and academic circles value judgments are changing to avoid concerns over environmental and civil concerns. Recently, there has been a movement to introduce zero liquid discharge systems not only for specific wastewater but also for all water.

It is estimated that approximately 100 zero liquid discharge systems are now operational in Japan, and thousands of zero liquid discharge systems are operational in the United States.

The zero liquid discharge systems in Japan are mainly installed in high valued added semiconductor factories but require a great deal of high quality water and have significant installation and operating expenses because the installation regions are limited to specific contaminant discharge areas, such as national parks.

For example, the Canon company is located in Oita, Japan and manufactures cartridges for photocopiers. Oita is incorporated in a limited immutable weight region and a ban was requested on wastewater discharge by the nearby National Federation of Fisheries Cooperatives. Hence, the Canon company introduced a zero liquid discharge system. As another example, UMC Japan, which is a semiconductor manufacturing factory, introduced a zero liquid discharge system because the factory was located in a national park.

Zero liquid discharge systems in the United States have been introduced mainly in areas where strict effluent water quality standards were applied, when effluent water quality standards were established by the state, or in factories located in regions lacking an abundant supply of water such as deserts.

As an example, La Paloma Plant is a thermoelectric power plant located in the middle of the Mojave Desert in California. It introduced a zero liquid discharge system because very strict effluent water quality standards were applied. The plant is located in a large-scale agricultural area, water supply from nearby areas of the Mojave Desert is not good, and the price of water is very high. La Paloma Plant reuses recovered water as boiler makeup water for running a power plant turbine. As another example, Intel, which is a semiconductor factory, also introduced a zero liquid discharge system because of strict effluent water quality standards and industrial water shortages in the climate of Arizona.

This kind of ZLD, which is a process of reusing treated sewage water and of discharging a small quantity of sludge excluding the treated water, is divided into two types. A Reverse Osmosis (RO) ZLD is a separation process using reverse osmosis. A thermal ZLD evaporatively concentrates and phase changes by heating. Evaporative concentration technology utilized in the $19^{th}$ century food industry and intensified environmental regulations leading to increased reuse of water resources have increased demands in thermal ZLD technology applied in various industry fields.

The thermal ZLD process using phase change be heating is mostly effective in non-degradable wastewater. A waste heat steam heating type uses a boiler, an evaporation type operates in a vacuum decompressed state, and a flame direct heating type uses methods of heating wastewater.

The waste heat steam heating type requires a large-scale infrastructure, a large installation scale and excessive installation costs. A flame direct heating type provides a treatment effect like a simple evaporation type but has increased energy consumption.

The vacuum decompressed evaporation type provides an energy savings because it is a method of evaporation by lowering the boiling point of wastewater while keeping the pressure inside the evaporator in a vacuum condition. But this type has several disadvantages including that the treatment result may be non-uniform dependent on conditions of the introduced wastewater, and that it is difficult to maintain and repair due to maintenance of the vacuum condition.

A schematic basic structure of a falling film evaporator is illustrated in FIG. 1.

The evaporator 1 includes: a cylindrical housing 10; a flow uniformity device 20 provided by a plate horizontally mounted at an upper portion of the housing 10; and a wastewater inlet 11 mounted higher than the flow uniformity device 20, such that introduced wastewater is supplied to an upstream space S1 of the upper portion of the flow uniformity device 20.

A plurality of evaporation tubes 30 are densely mounted inside the housing 10. Upper ends of the evaporation tubes 30 penetrate the flow uniformity device 20 in such a way that the upstream space S1 communicates with an inner space of the evaporation tubes 30. Therefore, wastewater supplied into the upstream space S1 flows down along the inner walls of the evaporation tubes 30. The wastewater evaporated and concentrated while passing through the evaporator 1 is collected in a liquid storage tank S3 of the evaporator 1. The wastewater flowing down along the inner walls of the evaporation tubes 30 forms a falling film that is evaporated while being heated by heat exchange with vapor disposed on the outside of the walls of the evaporation tubes 30. The vapor is introduced into a heat exchange space S2 in the middle of the housing 10 via a vapor inlet 40. A vapor outlet 50 extracts vapor having undergone heat exchange in the heat exchange space S2 of the housing 10 and discharges the extracted vapor from the evaporator 1.

Such a falling film evaporator may restrain a rise of the boiling point without pressure loss inside the device and reduce contact time with a heating body, such as vapor, because a heat transfer rate is very high even though there is a difference in temperature with a heating fluid. Moreover, the falling film evaporator may reduce temperature increase of liquid that is sensitive to heat because a thermal gradient in a liquid film kept at about 1 mm to 2 mm is very small.

Furthermore, the falling film evaporator may sufficiently transfer heat even though a temperature difference between the heating fluid and the inside fluid becomes less than 10° C. because the heat transfer rate is very high. The inside fluid temperature may be maintained and not rise excessively.

The falling film evaporator has further advantages in that a period of time required for achieving steady-state operating conditions of the evaporator is relatively short and a period of time required for stopping operation is also short because the volume of the wastewater inside the tube is small. It is effective in low enriched fluid evaporation and power consumption of a circulation pump may be kept low.

However, if the wastewater film is broken, scale may be formed on the inner walls of the tubes. The falling film evaporator is difficult to employ when the wastewater includes lots of scale components. It also may require a distributor design technology to distribute wastewater to each of the tubes uniformly, for example, to prevent the film from breaking.

In more detail, the falling film evaporator includes long tubes of more than 10 m in length. Therefore, the falling film evaporator has several disadvantages in that an evaporative concentration efficiency of the entire device is reduced because a zone where the wastewater film is dried, namely a dry zone, is highly likely to be formed in the proximity of the downstream side, in that workability is deteriorated at the time of installation or maintenance, and in that it takes a relatively long time to achieve operational conditions because the tubes are long.

BRIEF SUMMARY

Accordingly, the present disclosure has been made to address the above-mentioned problems. It is an object of the present disclosure to provide a stacked type falling film evaporator, a zero liquid discharge system comprising the same, and a zero liquid discharging method using the same. Two evaporators may respectively have evaporation tubes with a relatively short length that are installed in a two-stage stacked type in a vertical direction, thereby addressing the problems of other evaporators with reduced efficiency due to formation of a dry zone inside the evaporation tubes, providing easy installation and maintenance due to modularization, simplifying pipelines, and reducing a site area required for installing equipment.

In an embodiment, there is provided a stacked type falling film evaporator which includes: a housing standing erect and having a wastewater inlet disposed at an upper portion thereof and a liquid storage tank disposed at a lower portion thereof for storing concentrated wastewater; a flow uniformity device horizontally fixed and mounted at the upper portion of the housing in such a manner that wastewater introduced from the wastewater inlet can be stored; a plurality of evaporation tubes standing erect in such a manner that the upper end vertically penetrates the flow uniformity device and an opening portion of the upper end communicates with an upstream space of the flow uniformity device; a vapor inlet for introducing vapor into a heat exchange space of the housing in order to heat the outer walls of the evaporation tubes; and a condensate water recovery hole for recovering condensate water which is introduced into the heat exchange space and condensed through heat exchange with evaporation tubes, such that the wastewater introduced through the wastewater inlet flows into the upstream space and is evaporated while flowing in the form of a falling film along the inner walls of the evaporation tubes, the falling film evaporator further including: a first evaporator and a second evaporator respectively having evaporation tubes of a length of 5 m to 10 m, the first evaporator and the second evaporator being stacked vertically in such a manner that wastewater passes through the first evaporator and the second evaporator in order; a first vapor recovering device for collecting vapor generated from the wastewater in the first evaporator and supplying the collected vapor to the second evaporator; a second vapor recovering device for collecting vapor generated from the wastewater in the second evaporator and supplying the collected vapor to the first evaporator; and a vapor recompressor for compressing vapor before the vapor collected in the second vapor recovering device is supplied to the first evaporator.

The vapor recompressor may be a thermal vapor recompressor, and the stacked type falling film evaporator may include second vapor recompressor 170 for compressing vapor before the vapor collected in the first vapor recovering device is supplied to the second evaporator.

The stacked type falling film evaporator may include a circulation pump for supplying the concentrated wastewater passing through the second evaporator to the upper portion of the first evaporator. When the falling film evaporator is operated, the temperature of the wastewater inside the evaporation tube may be 70° C. to 130° C. and the inside pressure of the evaporation tube may be 50 Torr to 150 Torr.

In another embodiment, a zero liquid discharge system includes a falling film evaporator for evaporating wastewater introduced through a wastewater inlet while the introduced wastewater flows into the upstream space and flows in the form of a falling film along the inner walls of evaporation tubes, the zero liquid discharge system further including: a wastewater pretreatment device in which the introduced wastewater passes in consecutive order; a crystallization device; a condenser adapted for finally condensing vapor generated from the wastewater in order to recover condensate water; and a sludge treatment device for treating sludge generated from the wastewater into a finally discarded form through centrifugation, wherein the falling film evaporator includes: a first evaporator and a second evaporator respectively having evaporation tubes of a length of 5 m to 10 m, the first evaporator and the second evaporator being stacked vertically in such a manner that wastewater passes through the first evaporator and the second evaporator in order; a first vapor recovering device for collecting vapor generated from the wastewater in the first evaporator and supplying the collected vapor to the second evaporator; a second vapor recovering device for collecting vapor generated from the wastewater in the second evaporator and supplying the collected vapor to the first evaporator; and a vapor recompressor for compressing vapor before the vapor collected in the second vapor recovering device is supplied to the first evaporator.

The wastewater pretreatment device may be at least one selected from a group of a caustic soda treatment tank, an alum treatment tank, a polymer treatment tank, and a settling separation tank, the crystallizing device is a forced circulation evaporator, and the zero liquid discharge system further includes a reverse osmosis separator disposed at the upstream side of the falling film evaporator.

In another embodiment, a zero liquid discharging method includes: a pretreatment step of pretreating introduced wastewater through a wastewater pretreatment device; an evaporation step of evaporating and concentrating the pretreated wastewater through a falling film evaporator; a crystallizing step of phase-separating the concentrated wastewater through a crystallizing device; and a post-treatment step of finally concentrating vapor, which is phase-separated and generated from the wastewater, through a condenser so as to recover condensate water and treating the sludge generated from the wastewater into a finally discarded form through centrifugation by a sludge treatment device, wherein the evaporation step includes: a first evaporation step and a second evaporation step of evaporating and concentrating wastewater introduced into the first evaporator in order through a falling film evaporator in which a first evaporator and a second evaporator respectively having evaporation tubes of a length of 5 m to 10 m are stacked vertically; a downward supplying step of collecting vapor generated from wastewater in the first evaporator and supplying the collected vapor to the second evaporator through a first vapor recovering device; an upward recompressing step of collecting vapor generated from the wastewater in the second evaporator and transferring the collected vapor to a vapor recompressor through a second vapor recovering device; and an upward supplying step of supplying the vapor compressed in the vapor recompressor to the first evaporator.

The zero liquid discharging method may include: a downward recompressing step of compressing vapor generated from the wastewater in the first evaporator through second vapor recompressor 170 before supplying the collected vapor to the second evaporator in the downward supplying step; or a wastewater circulating step of supplying the concentrated wastewater passing through the second evaporator to the upper portion of the first evaporator through a circulation pump after the second evaporation step.

The wastewater pretreatment device in the pretreatment step may be at least one selected from a group of a caustic soda treatment tank, an alum treatment tank, a polymer treatment tank, and a settling separation tank. The zero liquid discharging method may include an RO (Reverse Osmosis) step of separating the pretreated wastewater through a reverse osmosis separator.

The stacked type falling film evaporator, the zero liquid discharge system comprising the same, and the zero liquid discharging method using the same according to the embodiments of the present disclosure may enhance workability in installation and maintenance and may arrive at steady-state operating conditions because the evaporation tubes are shorter than the long tubes mounted in other falling film evaporators.

Additionally, the stacked type falling film evaporator, the zero liquid discharge system comprising the same, and the zero liquid discharging method using the same according to the embodiments of the present disclosure may address problems in installation and maintenance due to modularization of the stacked type system units, reduce required site area because the falling film evaporator is the stacked type, reduce energy consumption for carrying out processes because the piping structure of the falling film evaporator is simpler than a horizontal type multi-stage evaporator and does not require additional energy consumption for supply of wastewater to the downstream side, and multilaterally cope with the problem of the heat exchange type evaporator by vertical tubes that scale is formed on the inner walls of the tubes.

BRIEF DESCRIPTION OF THE DRAWINGS

The above and other objects, features and advantages of the present disclosure will be apparent from the following detailed description in conjunction with the accompanying drawings, in which.

DETAILED DESCRIPTION

Reference will be now made in detail to the embodiments of the present disclosure with reference to the attached drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure.

Figure 1:
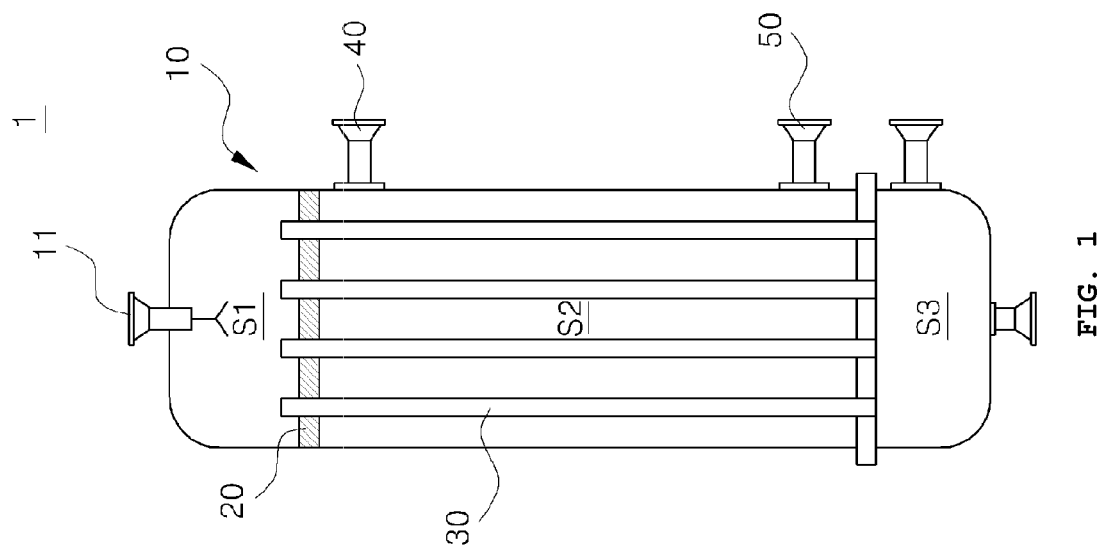
FIG. 1 is a cross-sectional diagram showing a structure of a falling film evaporator.
Figure 2:
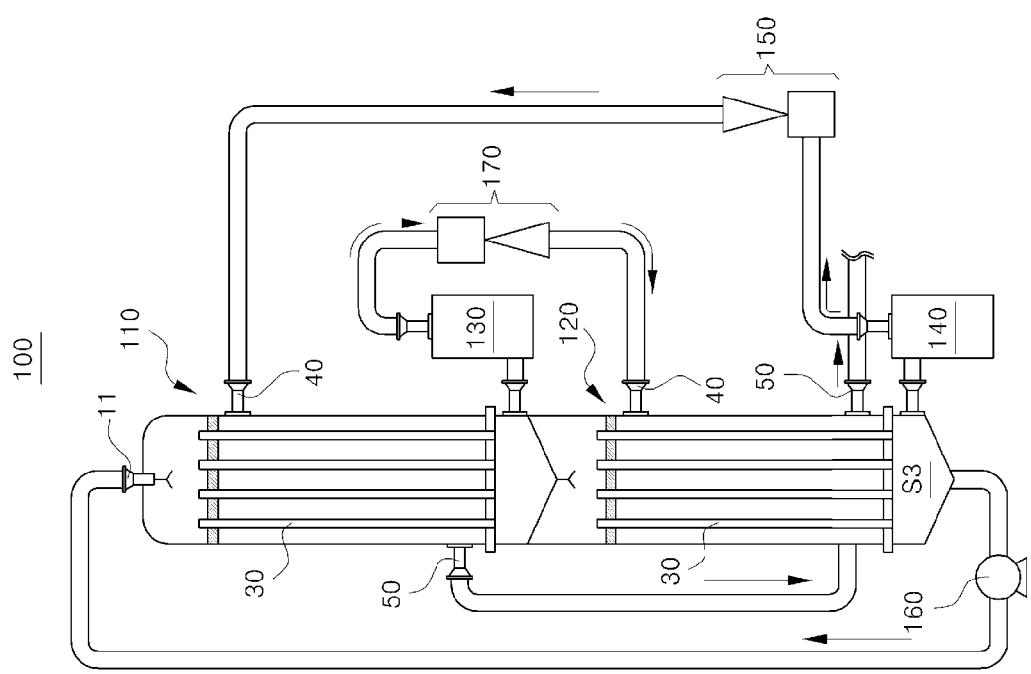
FIG. 2 is a cross-sectional diagram showing a structure of a stacked type falling film evaporator according to an embodiment of the present disclosure.

Referring to FIG. 2, according to an embodiment of the present disclosure, a stacked type falling film evaporator includes a first evaporator 110 and a second evaporator 120 respectively having evaporation tubes 30 of a length of 5 m to 10 m. The first evaporator 110 and the second evaporator 120 are stacked vertically in such a manner that wastewater passes through the first evaporator 110 and the second evaporator 120 in order. A first vapor recovering device 130 collects vapor generated from wastewater in the first evaporator 110 and supplies the collected vapor to the second evaporator 120. A second vapor recovering device 140 collects vapor generated from wastewater in the second evaporator 120 and supplies the collected vapor to the first evaporator 110. A vapor recompressor 150 compresses vapor before the vapor collected in the second vapor recovering device 140 is supplied to the first evaporator 110.

The plurality of evaporation tubes 30 inserted into the first evaporator 110 and the second evaporator 120 of the falling film evaporator 100 may have a length of 5 m to 10 m. As described above, evaporation tubes of other falling film evaporators are generally more than 10 m long, and hence, have the above-mentioned problems.

If the evaporation tubes 30 are less than 5 m long, the tubes may be too short and a falling film formed on the inner wall of each of the evaporation tubes 30 may be thick and it is difficult to control the falling film to the optimum thickness. However, if the evaporation tubes 30 are more than 10 m long, efficiency in an evaporation process may be deteriorated due to formation of a dry zone at a lower end of the tube.

As described above, because the evaporation tube 30 is short, the falling film evaporator may enhance workability in installation or maintenance/repair and easily achieves steady state operating conditions.

The quantity of wastewater may be reduced by shortening the evaporation tube 30. The first and second evaporators may be stacked vertically in such a manner that wastewater is evaporated and concentrated while passing the first evaporator 110 and the second evaporator 120 in order.

Therefore, the stacked type falling film evaporator according to embodiments of the present disclosure may increase an amount of wastewater that will be treated in the evaporation process, which may address problems in installation and maintenance due to modularization of the stacked type system units, reduce a required site area because the falling film evaporator is the stacked type, reduce energy consumption for carrying out processes because the piping structure of the falling film evaporator is simpler than the horizontal type multi-stage evaporator and does not require additional energy consumption for supply of wastewater to the downstream side, and multilaterally copes with the problem of the heat exchange type evaporator by vertical tubes that scale is formed on the inner walls of the tubes.

Moreover, the stacked type falling film evaporator may include a first vapor recovering device 130, a second vapor recovering device 140, and a vapor recompressor 150. The wastewater introduced into the first evaporator 110 is heated and evaporated in the evaporation tubes 30, such that vapor is generated. The vapor generated from wastewater is collected, and then, is not directly condensed and discharged but transferred to the second evaporator 120 so as to be used for heating wastewater. For this, the first vapor recovering device 130 is provided. Furthermore, the second evaporator 120 also generates vapor from wastewater, and the vapor is collected and transferred to the first evaporator 110 through the second vapor recovering device 140. In this instance, when the vapor collected from the second evaporator 120 is compressed into high-pressure vapor and supplied to the first evaporator 110, the recompressor 150 enhances heat-exchange efficiency of the vapor.

The vapor recompressor 150 serves to compress the vapor collected from the evaporator into high-pressure vapor, and may be provided by a mechanical vapor recompressor and/or a thermal vapor recompressor. According to an embodiment of the present disclosure, the vapor recompressor 150 may be a thermal vapor recompressor. The thermal vapor recompressor may be more energy efficient, may process more vapor than the mechanical vapor recompressor, and may be more effectively applied to the stacked structure of the falling film evaporator 100. However, a mechanical vapor recompressor may also be used.

In addition to a vapor recompressor 150 coupled to pipes which collect the vapor from the second evaporator 120 and supply the compressed vapor to the first evaporator 110, second vapor recompressor 170 is coupled to pipes which collect vapor from the first evaporator 110 and supply the compressed vapor to the second evaporator 120 so as to enhance the heat-exchange efficiency in the second evaporator 120. Additionally, when the operation of the two vapor recompressors 150, 170 is controlled, improved vapor circulation may be achieved.

The wastewater evaporated and concentrated while passing through the first evaporator 110 and the second evaporator 120 in order is collected in a liquid storage tank S3 of the second evaporator 120. A fixed amount of the collected and concentrated wastewater is supplied to a wastewater inlet 11 located at an upper portion of the first evaporator 110 through a circulation pump 160 in order to increase the concentration of wastewater which will be treated under the steady-state operating conditions.

During operation of the falling film evaporator 100, the temperature of the wastewater inside the evaporation tubes 30 and the inside pressure of the evaporation tubes 30 may be controlled according to physical conditions, such as ingredients, viscosity and quantity of the wastewater. In some cases, the temperature of the wastewater inside the evaporation tubes 30 is 70° C. to 130° C. and the inside pressure of the evaporation tubes 30 is 50 Torr to 150 Torr.

When the temperature of vapor supplied to the evaporator is controlled to 10° C. to 120° C., temperature of the wastewater inside the system may be controlled to 70° C. to 130° C. and the inside pressure of the system may be controlled to 50 Torr to 150 Torr so as to improve heat transfer efficiency and reduce chemical reactions between different ingredients contained in the wastewater.

If the temperature of the wastewater is lower than 70° C., the wastewater is not effectively evaporated and evaporation efficiency of the entire system is deteriorated. Furthermore, if the temperature of the wastewater exceeds 130° C., chemical reactions may occur between the different components in the wastewater, and the invested thermal energy is not economical.

Additionally, if the inside pressure of the evaporation tubes 30 is less than 50 Torr, a high vacuum condition is kept, which is not energy efficient and causes difficulty in operating processes. If the inside pressure of the evaporation tubes 30 exceeds 150 Torr, evaporation and separation efficiencies may be deteriorated.

Figure 3:
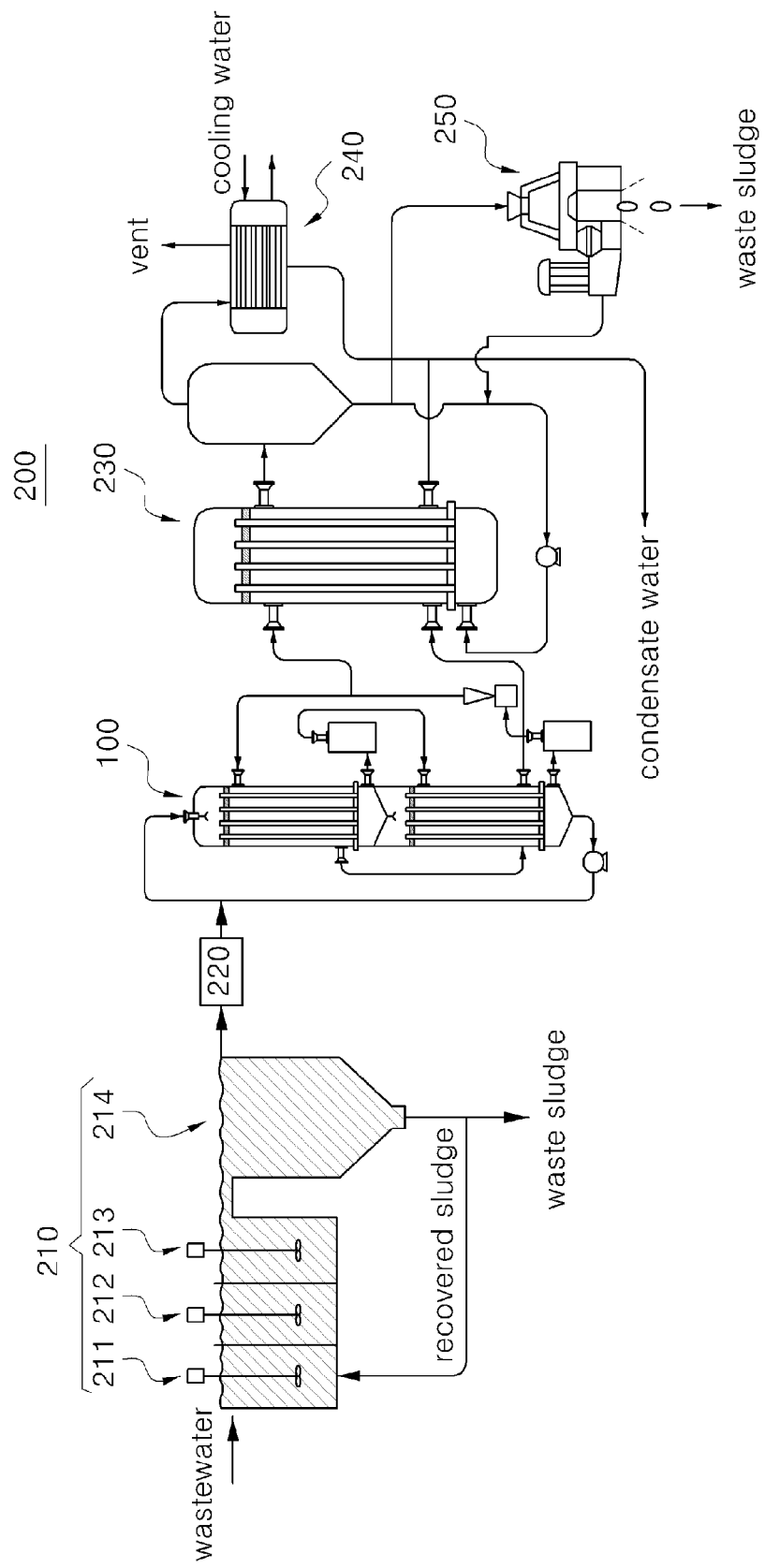
FIG. 3 is a system diagram showing a zero liquid discharge system including the stacked type falling film evaporator according to another embodiment of the present disclosure.

FIG. 3 is a system diagram showing the zero liquid discharge system 200 according to an embodiment of the present disclosure.

Referring to FIG. 3, according to another embodiment of the present disclosure, a zero liquid discharge (ZLD) system includes: a wastewater pretreatment device 210 in which introduced wastewater passes in consecutive order, a falling film evaporator 100, a crystallization device 230, a condenser 240 adapted for condensing vapor generated from the wastewater in order to recover condensate water, and a sludge treatment device 250 for treating sludge generated from the wastewater into a discarded form through centrifugation.

The falling film evaporator 100 includes a first evaporator 110 and a second evaporator 120 respectively having evaporation tubes 30 of a length of 5 m to 10 m. The first evaporator 110 and the second evaporator 120 are stacked vertically in such a manner that wastewater passes through the first evaporator 110 and the second evaporator 120 in order. A first vapor recovering device 130 collects vapor generated from wastewater in the first evaporator 110 and supplies the collected vapor to the second evaporator 120. A second vapor recovering device 140 collects vapor generated from wastewater in the second evaporator 120 and supplies the collected vapor to the first evaporator 110. A vapor recompressor 150 compresses vapor before the vapor collected in the second vapor recovering device 140 is supplied to the first evaporator 110.

The zero liquid discharge system may be a thermal Zero Liquid Discharge (ZLD) system or an Reverse Osmosis (RO) ZLD system. In the described embodiment, the zero liquid discharge system 200 is a thermal ZLD system. As described above, the zero liquid discharge system 200 includes the wastewater pretreatment device 210, the falling film evaporator 100, the crystallization device 230, the condenser 240, and the sludge treatment device 250.

The wastewater pretreatment device 210 is a device for removing and separating relatively large impurities through precipitation or precipitation-related response. Furthermore, pretreatment devices of various types may be adopted according to physical properties of wastewater. A caustic soda treatment tank 211 may be used to neutralize acid wastewater, such as desulfurized wastewater, using caustic soda. An alum treatment tank 212 may be used to separate organic materials using a coagulating agent, such as alum. A polymer treatment tank 213 may be used to deposit floating matter through a polymer coagulant. A settling separation tank 214 may be used to separate deposits by storing and chemically treating wastewater for a predetermined period of time.

The crystallization device 230 is a device used for a crystallizing process in which high-temperature evaporation concentrates wastewater, which was evaporated and concentrated while passing the falling film evaporator 100, so as to separate the wastewater into solid-phase sludge and vapor.

Various crystallizing devices 230 may be used. In the described embodiment, a forced circulation evaporator is used. The forced circulation evaporator uses a pump that is wider in installation area than the falling film evaporator 100 to keep the velocity inside the evaporation tubes 30 at 2 m/s to 3 m/s, which may have high power consumption and require expensive equipment. However, the forced circulation evaporator has several advantages in that scale formation rate is low because it can keep a liquid flow steady inside the heat exchange tube to maintain the liquid film thickness. It is easy to clean, and it can accommodate high-concentration fluids or fluids in which scale is formed easily. It is suitable for treatment of high-concentration wastewater with a high Boiling Point Elevation (BPE) and wastewater which is difficult in natural circulation due to a high viscosity. Therefore, the forced circulation evaporator is suitable for additionally evaporating and concentrating highly concentrated wastewater which passes the falling film evaporator 100.

Next, after the crystallizing process, the wastewater passes to the condenser 240 and the sludge treatment device 250. A phase separation of the concentrated wastewater occurs through the crystallizing process in the crystallizing device 230. In this instance, vapor generated from the wastewater is collected, and then, the collected vapor is cooled into cooling water by the condenser 240 and is discharged or is generated into reusable condensate water. Meanwhile, the sludge generated from the wastewater is treated into a sludge cake through centrifugation in the sludge treatment device 250 and then discharged.

Moreover, the zero liquid discharge system may also include a reverse osmosis separator 220 disposed at the upstream side of the falling film evaporator 100. In order to increase zero liquid discharge efficiency of the wastewater, the present disclosure may adopt a hybrid process that the ZLD process by reverse osmosis is combined to the thermal ZLD process of the present disclosure.

Figure 4:
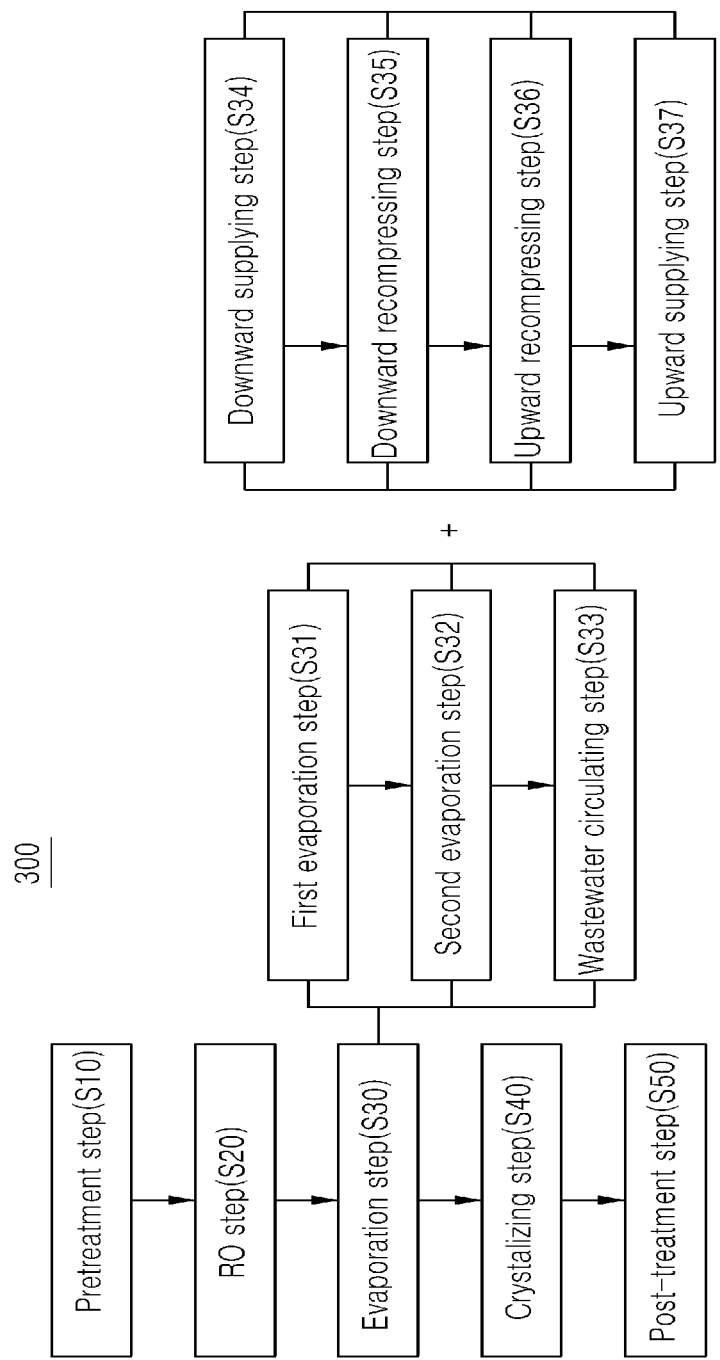
FIG. 4 is a flow chart showing a zero liquid discharge method using the stacked type falling film evaporator according to a further embodiment of the present disclosure.

FIG. 4 is a flow chart showing the zero liquid discharge method according to the embodiment of the present disclosure.

Referring to FIG. 4, according to a further embodiment of the present disclosure, a zero liquid discharging method 300 includes: a pretreatment step (S10) of pretreating introduced wastewater through a wastewater pretreatment device 210; an evaporation step (S30) of evaporating and concentrating the pretreated wastewater through a falling film evaporator 100; a crystallizing step (S40) of phase-separating the concentrated wastewater through a crystallizing device 230; and a post-treatment step (S50) of concentrating vapor, which is phase-separated and generated from the wastewater, through a condenser 240 so as to recover condensate water and treating the sludge generated from the wastewater into a discarded form through centrifugation by a sludge treatment device 250. The evaporation step (S30) includes: a first evaporation step (S31) and a second evaporation step (S32) of evaporating and concentrating wastewater introduced into a first evaporator 110 and a second evaporator 120 of a falling film evaporator, in order, respectively having evaporation tubes 30 of a length of 5 m to 10 m and stacked vertically; a downward supplying step (S34) of collecting vapor generated from wastewater in the first evaporator 110 and supplying the collected vapor to the second evaporator 120 through a first vapor recovering device 130; an upward recompressing step (S36) of collecting vapor generated from the wastewater in the second evaporator 120 and transferring the collected vapor to a vapor recompressor 150 through a second vapor recovering device 140; and an upward supplying step (S37) of supplying the vapor compressed in the vapor recompressor 150 to the first evaporator 110.

Hereinafter, the zero liquid discharging method 300 will be described in time sequential order.

First, wastewater is introduced into the wastewater pretreatment device 210, and then, goes through the pretreatment step (S10). After that, the pretreated wastewater may go through the evaporation step (S30) in the falling film evaporator 100 or may go through an RO step (S20) in the reverse osmosis separator 220 according to an embodiment of the present disclosure.

To form higher-concentration wastewater by recovering moisture from the concentrated wastewater through the evaporation step (S30), the wastewater goes through the crystallizing step (S40) in which phase separation of the concentrated wastewater occurs in the crystallizing device 230 (e.g., a forced circulation evaporator). Vapor and sludge generated through the phase separation of the wastewater by the crystallizing step (S40) are respectively concentrated in the condenser 240 or through the post-treatment step (S50) such that the sludge is treated into a discardable form, such as a sludge cake, through centrifugation by the sludge treatment device 250.

The evaporation step (S30) may be divided into a flow of wastewater and a flow of vapor/condensate water. First, the flow of wastewater will be described. The wastewater goes through the first evaporator 110 in the first evaporation step (S31), and through the second evaporator 120 in the second evaporation step (S32). Some of the wastewater concentrated after the second evaporation step (S32) is returned to the first evaporator 110 in the wastewater circulating step (S33).

Now, the flow of vapor/condensate water will be described. Vapor introduced into the first evaporator 110 is concentrated through heat exchange with the wastewater inside the evaporation tubes 30 generating vapor from the wastewater. The generated vapor goes through the downward supplying step (S34) of collecting the vapor and supplying the collected vapor to the second evaporator 120, the upward recompressing step (S36) of collecting vapor generated from the wastewater in the second evaporator 120 and transferring the collected vapor to the vapor recompressor 150, and the upward supplying step (S37) of supplying the high-pressure vapor generated in the vapor recompressor 150 to the heat exchange space S2 of first evaporator 110. The zero liquid discharging method may further include a downward recompressing step (S35) of supplying high-pressure vapor generated by second vapor recompressor 170 to the second evaporator 120 after the upward supplying step (S34).

While the present disclosure has been particularly shown and described with reference to exemplary embodiments thereof, it will be understood by those of ordinary skill in the art that various changes and modifications may be made therein without departing from the technical idea and scope of the present disclosure and such changes and modifications belong to the claims of the present disclosure. Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A stacked type falling film evaporator, comprising:
   a first falling film evaporator and the second falling film evaporator stacked in such a manner that wastewater passes through the first falling film evaporator and the second falling film evaporator in order;
   a first pipe, connected between a liquid storage tank of the first falling film evaporator and a vapor inlet of the second falling film evaporator, that collects vapor generated from the wastewater in the first falling film evaporator and supplies the collected vapor to the second falling film evaporator;
   a second pipe, connected between a liquid storage tank of the second falling film evaporator and a vapor inlet of the first falling film evaporator, that collects vapor generated from the wastewater in the second falling film evaporator and supplies the collected vapor to the first falling film evaporator;
   a vapor recompressor that compresses the vapor collected in the second pipe before the vapor is supplied to the first falling film evaporator; and
   a circulation pump that supplies concentrated wastewater exiting the second falling film evaporator to an upstream space of the first falling film evaporator.

2. The stacked type falling film evaporator according to claim 1, wherein the vapor recompressor is a thermal vapor recompressor.

3. The stacked type falling film evaporator according to claim 1, further comprising a second vapor recompressor that compresses the vapor collected in the first pipe before the vapor is supplied to the second falling film evaporator.

4. The stacked type falling film evaporator according to claim 1, wherein each of the first and second falling film evaporators includes:
   a housing having a wastewater inlet disposed at a top portion thereof and the liquid storage tank that stores concentrated wastewater disposed at bottom portion thereof;
   a flow uniformity device that separates an upstream space from a heat exchange space comprising a plurality of evaporation tubes;
   the plurality of evaporation tubes of a length of about 5 m to 10 m passing through the flow uniformity device such that opening portions of ends of the tubes are disposed in the upstream space;
   the vapor inlet that introduces vapor into the heat exchange space in order to heat the outer walls of the evaporation tubes; and
   a condensate water recovery aperture that recovers condensate water which is introduced into the heat exchange space and concentrated through heat exchange with the evaporation tubes, such that the wastewater introduced through the wastewater inlet flows into the upstream space and is evaporated while flowing in the form of a falling film along inner walls of the evaporation tubes.

5. A zero liquid discharge system, comprising:
   a stacked type falling film evaporator;
   a wastewater pretreatment device in which introduced wastewater passes pretreatment devices in consecutive order and is passed to the stacked type falling film evaporator;
   a crystallization device to concentrate, by high-temperature evaporation, wastewater which was evaporated and concentrated while passing through the stacked type falling film evaporator;
   a condenser adapted to condense vapor, generated from the wastewater and separated by the crystallization device, and recover condensate water; and
   a sludge treatment device for treating sludge, generated from the wastewater and separated by the crystallization device, into a discardable form through centrifugation;
   wherein the stacked type falling film evaporator includes:
      a first falling film evaporator and the second falling film evaporator stacked in such a manner that wastewater passes through the first falling film evaporator and the second falling film evaporator in order;
      a first pipe, connected between a liquid storage tank of the first falling film evaporator and a vapor inlet of the second falling film evaporator, that collects vapor generated from the wastewater in the first falling film evaporator and supplies the collected vapor to the second falling film evaporator;
      a second pipe, connected between a liquid storage tank of the second falling film evaporator and a vapor inlet of the first falling film evaporator, that collects vapor generated from the wastewater in the second falling film evaporator and supplies the collected vapor to the first falling film evaporator; and a vapor recompressor that compresses the vapor collected in the second pipe before the vapor is supplied to the first falling film evaporator.

6. The zero liquid discharge system according to claim 5, wherein the vapor recompressor is a thermal vapor recompressor.

7. The zero liquid discharge system according to claim 5, further comprising a second vapor recompressor that compresses the vapor collected in the first pipe before the vapor is supplied to the second falling film evaporator.

8. The zero liquid discharge system according to claim 5, further comprising a circulation pump that supplies concentrated wastewater exiting the second falling film evaporator to an upstream space of the first falling film evaporator.

9. The zero liquid discharge system according to claim 5, wherein the wastewater pretreatment device is at least one selected from the group consisting of a caustic soda treatment tank, an alum treatment tank, a polymer treatment tank, and a settling separation tank.

10. The zero liquid discharge system according to claim 5, wherein the crystallizing device is a forced circulation evaporator.

11. The zero liquid discharge system according to claim 5, further comprising a reverse osmosis separator disposed at an upstream side of the stacked type falling film evaporator.

12. The zero liquid discharge system according to claim 5, wherein the stacked type falling film evaporator is adapted to evaporate wastewater introduced through a wastewater inlet, flowing into an upstream space, and flowing in the form of a falling film along inner walls of evaporation tubes.

13. The stacked type falling film evaporator according to claim 5, wherein each of the first and second falling film evaporators includes:
a housing having a wastewater inlet disposed at a top portion thereof and the liquid storage tank that stores concentrated wastewater disposed at a bottom portion thereof;
a flow uniformity device that separates an upstream space from a heat exchange space comprising a plurality of evaporation tubes;
the plurality of evaporation tubes of a length of about 5 m to 10 m passing through the flow uniformity device such that opening portions of ends of the tubes are disposed in the upstream space;
the vapor inlet that introduces vapor into the heat exchange space in order to heat the outer walls of the evaporation tubes;
a vapor outlet that extracts vapor having undergone heat exchange in the heat exchange space and provides the extracted vapor to the crystallization device; and
a condensate water recovery aperture that recovers condensate water which is introduced into the heat exchange space and concentrated through heat exchange with the evaporation tubes, such that the wastewater introduced through the wastewater inlet flows into the upstream space and is evaporated while flowing in the form of a falling film along inner walls of the evaporation tubes.

* * * * *